(12) United States Patent
Lin

(10) Patent No.: US 8,041,867 B2
(45) Date of Patent: Oct. 18, 2011

(54) METHOD AND APPARATUS FOR ENHANCING DATA RATE OF ADVANCED MICRO-CONTROLLER BUS ARCHITECTURE

(75) Inventor: Hsin-I Lin, I-Lan (TW)

(73) Assignee: NOVATEK Microelectronics Corp., Hsinchu Science Park, Hsin-Chu (TW)

( * ) Notice: Subject to any disclaimer, the term of this patent is extended or adjusted under 35 U.S.C. 154(b) by 254 days.

(21) Appl. No.: 11/538,812

(22) Filed: Oct. 5, 2006

(65) Prior Publication Data

US 2008/0059669 A1 Mar. 6, 2008

(30) Foreign Application Priority Data

Sep. 4, 2006 (TW) ................................ 95132628 A

(51) Int. Cl.
*G06F 13/00* (2006.01)
*G06F 13/14* (2006.01)
*G06F 13/36* (2006.01)
(52) U.S. Cl. .................. 710/110; 710/305; 710/306
(58) Field of Classification Search .................. 710/110, 710/305, 306
See application file for complete search history.

(56) References Cited

U.S. PATENT DOCUMENTS

| | | | | |
|---|---|---|---|---|
| 6,034,542 A * | 3/2000 | Ridgeway | ...................... | 326/39 |
| 6,442,642 B1 * | 8/2002 | Brooks | ........................ | 710/305 |
| 6,532,511 B1 * | 3/2003 | Brooks | ........................ | 710/305 |
| 6,687,773 B1 * | 2/2004 | Stewart et al. | .................. | 710/65 |
| 6,751,695 B1 * | 6/2004 | Jirgal | ............................ | 710/305 |
| 6,810,460 B1 * | 10/2004 | Kirkwood | ..................... | 710/306 |
| 6,829,669 B2 * | 12/2004 | Jahnke et al. | ................. | 710/306 |
| 7,013,356 B2 * | 3/2006 | Moss | .......................... | 710/200 |
| 7,076,582 B2 * | 7/2006 | Cho et al. | ..................... | 710/105 |
| 7,219,177 B2 * | 5/2007 | Chang et al. | .................. | 710/110 |
| 7,234,011 B2 * | 6/2007 | Chae | ............................. | 710/110 |
| 7,246,185 B1 * | 7/2007 | Pritchard et al. | ............. | 710/110 |
| 7,334,073 B2 * | 2/2008 | Choi et al. | ..................... | 710/315 |
| 7,370,127 B2 * | 5/2008 | Avishai et al. | .................. | 710/52 |
| 7,426,709 B1 * | 9/2008 | Ganesan | ......................... | 716/16 |
| 7,554,355 B2 * | 6/2009 | Chang et al. | .................... | 326/38 |
| 2003/0046510 A1 * | 3/2003 | North | ............................ | 711/203 |
| 2005/0021871 A1 * | 1/2005 | Georgiou et al. | ............ | 709/250 |
| 2006/0146811 A1 * | 7/2006 | Han et al. | ...................... | 370/386 |
| 2006/0271717 A1 * | 11/2006 | Koduri et al. | ................ | 710/241 |

OTHER PUBLICATIONS

Krishna Sekar, Flexbus: A High-Performance System on Chip Communication Architecture with Dynamically Configurable Topology, Jun. 13, 2005.*
Sekar et al, Flexbus: A High-Performance System-on-chip Communication Architecture with a Dynamically Configurable Topology, Jun. 13, 2005.*
Le et al, Formal Verification of a Pervasive Interconnect Bus System in a High-Performance Microprocessor, 2005.*

* cited by examiner

*Primary Examiner* — Mark Rinehart
*Assistant Examiner* — Christopher Daley
(74) *Attorney, Agent, or Firm* — Winston Hsu; Scott Margo

(57) ABSTRACT

A method for enhancing data rate of an advanced microcontroller bus architecture (AMBA) having an AHB system and an APB system includes simultaneously receiving control signals outputted from a plurality of master devices of the AHB system, and controlling a plurality of peripheral slave devices of the APB system according to the control signals outputted from the plurality of master devices.

9 Claims, 8 Drawing Sheets

METHOD AND APPARATUS FOR ENHANCING DATA RATE OF ADVANCED MICRO-CONTROLLER BUS ARCHITECTURE

BACKGROUND OF THE INVENTION

1. Field of the Invention

The present invention is related to a method and apparatus for enhancing data rate of an advanced micro-controller bus architecture, and more particularly, to a method and apparatus, used in the advanced micro-controller bus architecture, for controlling peripheral slave devices via directly receiving control signals outputted from more than one master device.

2. Description of the Prior Art

With rapid development of integrated circuit technology, the integration level of a chip has been developed higher and higher, and thereby integrating a complex system into an independent System-on-Chip (SoC) becomes achievable. Compared to a system formed on a circuit board, the SoC has advantages of weight, volume, performance, cost and so on. However, since the SoC implements a complete system, signal transmissions in the SoC become complicated. Therefore, the prior art provides an advanced micro-controller bus architecture (AMBA) for accomplishing an on-chip bus.

The AMBA, provided by ARM Corporation for a high-performance embedded system bus, is an open and free protocol, which defines Advanced High-Performance Bus (AHB), Advanced System Bus (ASB), Advanced Peripheral Bus (APB), Test Methodology, and so on. The AHB and ASB are applicable to high-performance and high clock-rate system modules, where the ASB adopts a bidirectional data bus to read and write data. The APB is applicable to low power-consumption external devices, detailed description of which can be downloaded from an ARM website "www.arm.com". Brief description of Advanced High-Performance Bus and Advanced Peripheral Bus is described as follows.

Please refer to FIG. 1. FIG. 1 depicts a schematic diagram of a prior art AMBA SoC 10. The SoC 10 comprises an AHB system 12, an APB system 14, and a bridge 16 between the AHB system 12 and the APB system 14. The AHB system 12 comprises master devices (such as embedded processors, direct memory access controllers or other auxiliary operators), slave devices (such as memory or other devices demanding wide bandwidths), and an infrastructure. Within the AHB system 12, all signal transmissions are delivered by the master devices and responded by the slave devices. The infrastructure of the AHB system 12 comprises an arbitrator, a master-to-slave multiplexer, a slave-to-master multiplexer, a decoder, dummy slaves, and dummy masters. What makes the AHB system 12 demand the arbitrator is that the AHB system 12 is a multi-master and pipeline-operation system, allowing only one master device using bus resources at one time. The Decoder takes a task on address decoding, so as to choose one of the slave devices to respond transmission. The multiplexers manager bus-routing for avoiding utilizing a tri-state bus.

The APB system 14 mainly implements a low-speed and low-power-consumption external bus for connecting peripheral devices demanding lower bandwidth, such as an Universal Asynchronous Receiver/Transmitter (UART), IEEE 1284 interface, timers . . . etc. Unlike the architecture of the AHB system 12, which is a multi-master structure, the APB system 14 has only one master device, the bridge 16. Therefore, the APB system 14 is much more uncomplicated than the AHB system 12, so that the APB system 14 does not need arbitrators and request or grant signals, and is not a pipeline system.

As mentioned above, the AHB system 12 is a multi-master and pipeline-operation system, allowing only one master using bus resources at one time, and thereby the APB system 14 is under control of the AHB system 12 via the bridge 16. Therefore, the bridge 16 can be seen as a slave device with regard to the AHB system 12, and seen as the only one master device with regard to the APB system 14. In other words, since there is only one master device allowed using bus resources at one time in the AHB system 12 and the APB system 14 is under control of the master, efficiency and bandwidth-utility rate of the APB system 14 are restricted by procedures of the AHB system 12. That is, even if there are available system resources, the system resources may be wasted because the APB system 14 must be under control of the AHB system 12. Thus, efficiency and bandwidth-utility rate of the APB system 14 cannot be increased.

Therefore, the prior art AMBA is unable to enhance the efficiency of the APB, which influences on allocation and use of system resources and thereby decreases data-processing speed of the SoC 10.

SUMMARY OF THE INVENTION

It is therefore an object of the present invention to provide a method and apparatus for enhancing data rate of an advanced micro-controller bus architecture.

The present invention discloses a method for enhancing data rate of an AMBA, the AMBA including an AHB system and an APB system, the method including: simultaneously receiving control signals outputted from a plurality of master devices of the AHB system; and controlling a plurality of peripheral slave devices of the APB system according to the control signals outputted from the plurality of master devices.

The present invention further discloses a bridge for enhancing data rate of an AMBA, the AMBA including an AHB system and an APB system, the bridge including a plurality of system data transmission interfaces, a peripheral data transmission interface, and a logic module. The plurality of system data transmission interfaces coupled to a plurality of master devices of the AHB system for simultaneously receiving control signals outputted from the plurality of master devices. The peripheral data transmission interface coupled to the APB system. The logic module coupled to the plurality of system data transmission interfaces and the peripheral data transmission interface for controlling a plurality of peripheral slave devices of the APB system according to the control signals outputted from the plurality of master devices.

The present invention further discloses a system-on-chip adopting an AMBA including a first system, a second system and a bridge. The first system includes a plurality of master devices and a plurality of system slave devices. The second system includes a plurality of peripheral slave devices. The bridge is coupled between the first system and the second system including a plurality of system data transmission interfaces coupled to the plurality of master devices and a peripheral data transmission interface coupled to the second system, for controlling the plurality of peripheral slave devices according to control signals outputted from the plurality of master devices.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
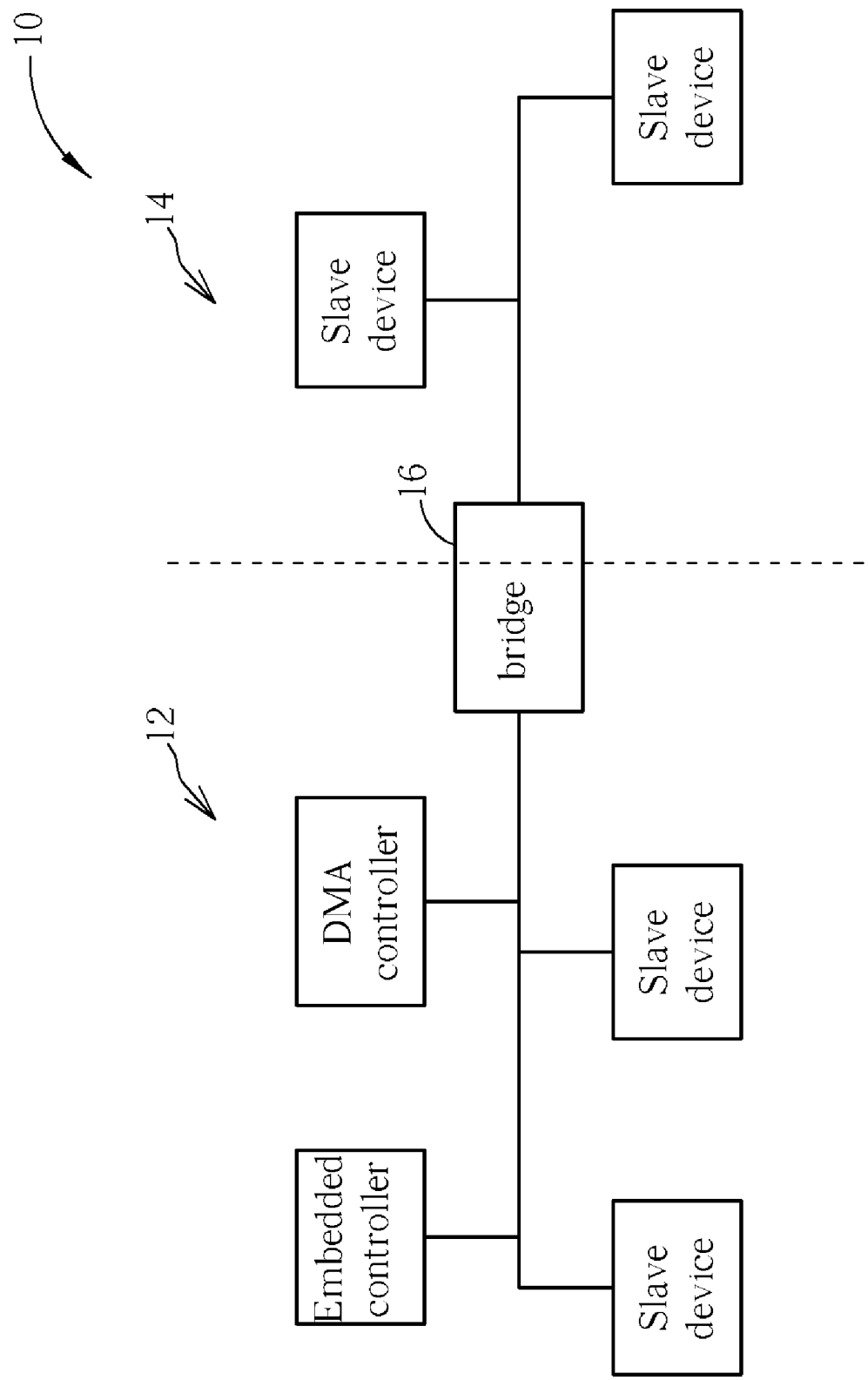
FIG. 1 depicts a schematic diagram of a prior art AMBA SoC of an AMBA.
Figure 2:
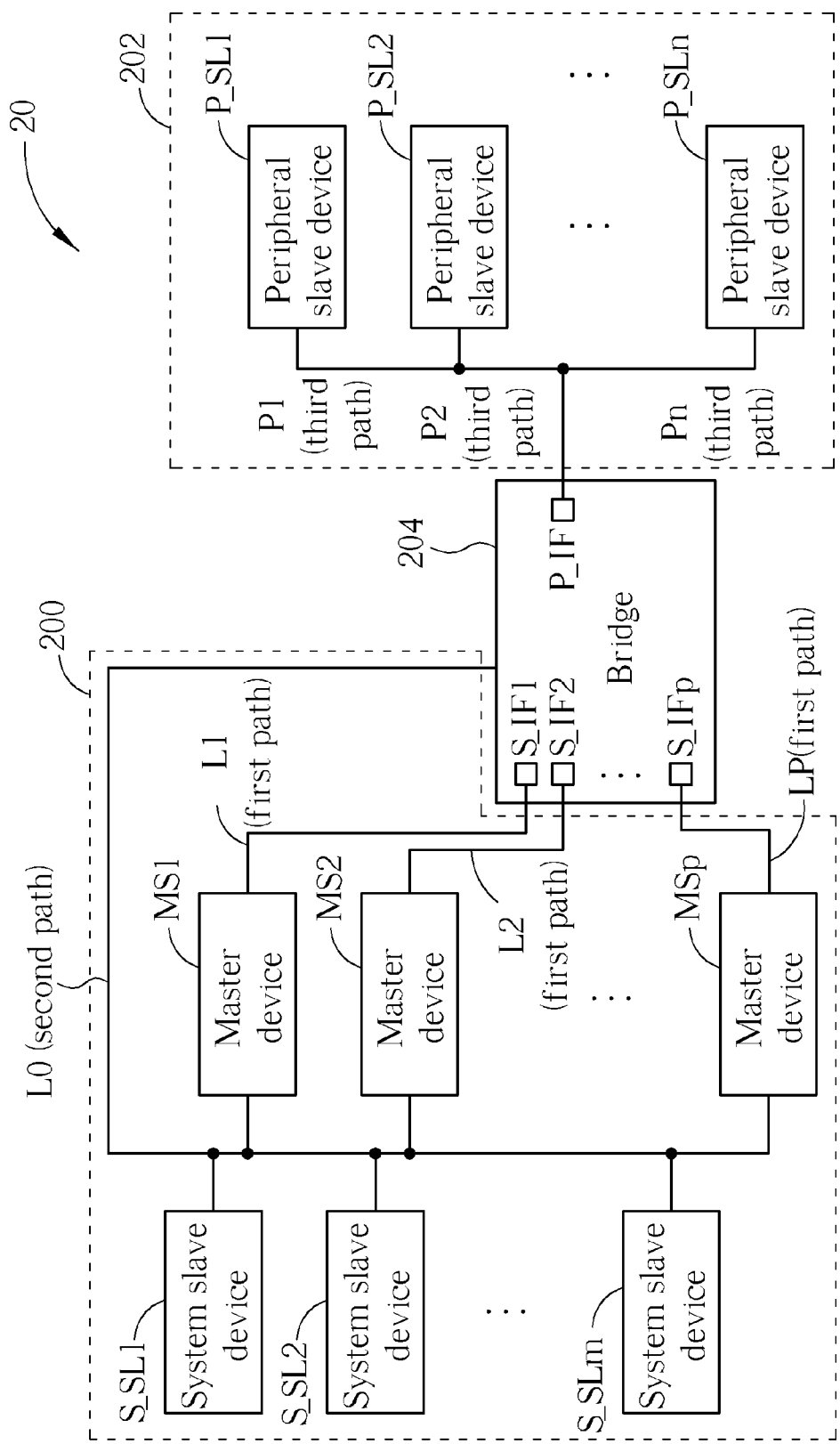
FIG. 2 depicts a schematic diagram of an AMBA SoC in accordance with an embodiment of the present invention.

Please refer to FIG. 2. FIG. 2 depicts a schematic diagram of an AMBA SoC 20 in accordance with the present invention. The SoC 20 includes a first system 200, paths L0-LP, a second system 202, paths P1-Pn and a bridge 204 coupled between the first system 200 and the second system 202. The first system 200 conforms to the AHB protocol, and includes master devices MS1~MSp, slave devices S_SL1~S_SLm, and an infrastructure (not shown in FIG. 2). In the first system 200, all signal transmissions through the path L0 coupled to the master devices MS1~MSp and the slave devices S_SL1~S_13 SLm are triggered by the master devices MS1~MSp and responded by the slave devices S_SL1~S_SLm, and thereby only one master device is allowed using bus resources corresponding to the path L0 at one time. Therefore, the infrastructure of the first system 200 includes an arbitrator for arbitrating authorities or priorities of the master devices MS1~MSp. The second system 202 conforms to the APB protocol, and includes peripheral slave devices P_SL1~PSL_n. In the second system, the peripheral slave devices P_SL1~P_SLn are under control of the master devices MS1~MSp via the bridge 204. That is, the bridge 204 can be seen as the only master device with regard to the second system 202. In the present invention, the bridge 204 includes system data transmission interfaces S_IF1~S_IFp and a peripheral data transmission interface P_IF. The data transmission interfaces S_IF1~S_IFp, respectively coupled to the master devices MS1~MSp via the paths L1-LP, are utilized for receiving control signals outputted from the master devices MS1~MSp. The peripheral data transmission interface P_IF is coupled to the second system 202 via the paths P1-Pn and used for controlling the peripheral slave devices P_SL1~P_SLn according to the control signals outputted from the master devices MS1~MSp. In other words, the bridge 204 can simultaneously receive the control signals outputted from the master devices MS1~MSp via the paths L1-LP when the resources corresponding to the path L0 are occupied and output signals corresponding to the peripheral slave devices P_SL1~P_SLn via paths P1-Pn according to priorities of the control signals.

According to the prior art AMBA, the AHB system is a multi-master and pipeline-operation system, allowing only one master device using bus resources at one time, and thereby the APB system is under control of the AHB system via a bridge. Therefore, the APB system can be under control of only one master device at one time, leading to the result that efficiency and bandwidth-utility rate of the APB system are restricted by procedures of the AHB system. In contrast, in the present invention, the bridge 204 can "directly" receive control signals outputted from each of the master devices MS1~MSp via the system data transmission interfaces S_IF1~S_Ifp (while the prior art utilizes one data transmission interface to receive all control signals outputted from the master devices MS1~MSp). Accordingly, if system resources of the first system 200 are occupied by a master device, other master devices can control the peripheral devices P_SL1~P_SLn of the second system 202 by the bridge 204. Under this circumstance, efficiency, operations, bandwidth-utility rate, or other performances of the first system 200 can be maintained, while that of the second system 202 can be enhanced dramatically. In other words, since the system data transmission interfaces directly receive control signals outputted from the master devices of the AHB system, the present invention can not only maintain efficiency of the AHB system, but also enhance efficiency, bandwidth-utility rate of the APB system in a premise that the present invention conforms to the AMBA protocol.

Please note that FIG. 2 is referred to as an embodiment of the present invention, and those skilled in the art can do modification if necessary. For example, the first system 200 can include other master devices indirectly coupled to the bridge 204 via a system data transmission interface, such as embedded processors, direct memory access controllers, or other auxiliary operators, and can further include a memory or other system slave devices requiring high-bandwidth. Similarly, the second system 202 can include peripheral slave devices demanding lower bandwidth, such as an universal asynchronous receiver/transmitter (UART), IEEE 1284 interface, timers and so on. In addition, the first system 200 conforms to the AHB protocol, where the infrastructure of the first system 200 includes an arbitrator for arbitrating priorities of the master devices MS1~MSp for using resources of the first system 200. On the other hand, the system data transmission interfaces S_IF1~S_Ifp and the peripheral data transmission interface P_IF in FIG. 2 are just schematic diagrams but can include a plurality of wires in implementations.

Figure 3:
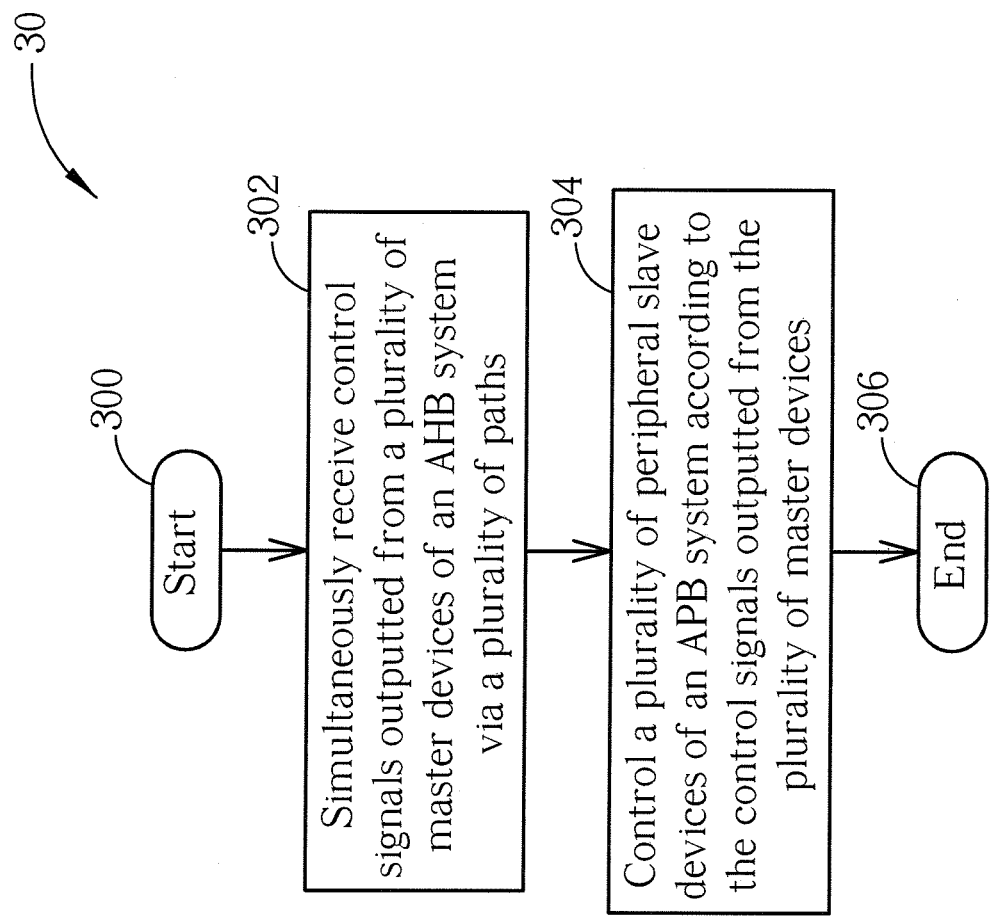
FIG. 3 depicts a flowchart of an embodiment of the present invention.

As for operations of the bridge 204 in the SoC 20, please refer to FIG. 3. FIG. 3 depicts a schematic diagram of a process 30 in accordance with the present invention. The process 30 can enhance data transmission rate of an AMBA. The process 30 includes the steps as follows:

Step 300: Start.

Step 302: Simultaneously receive control signals outputted from a plurality of master devices of an AHB system via the paths P1-Pn.

Step 304: Control a plurality of peripheral slave devices of an APB system according to the control signals outputted from the plurality of master devices.

Step 306: End.

According to the process 30, the present invention simultaneously receives control signals outputted from a plurality of master devices of an AHB system via the paths P1-Pn which are independent to each other and controls a plurality of peripheral slave devices of an APB system according to the received control signals. Therefore, even if one of the master devices occupies system resources (e.g. one of the paths P1-Pn) of the AHB system, other master devices can simultaneously output control signals for controlling the peripheral slave devices of the APB system via other paths. Under this circumstance, efficiency, operations, bandwidth-utility rate of the AHB system, or other performances are maintained, while that of the APB system can be enhanced dramatically. In other words, the present invention can not only maintain efficiency of the AHB system, but also enhance efficiency, bandwidth-utility rate of the APB system in a premise that the present invention conforms to the AMBA protocol.

The process 30 simultaneously receives control signals outputted from the plurality of master devices of the AHB system, and thereby the step 304 can determine and obtain control signals utilized for controlling the peripheral salve devices and further determine priorities of the control signals, so as to maintain normal system operations.

Figure 4:
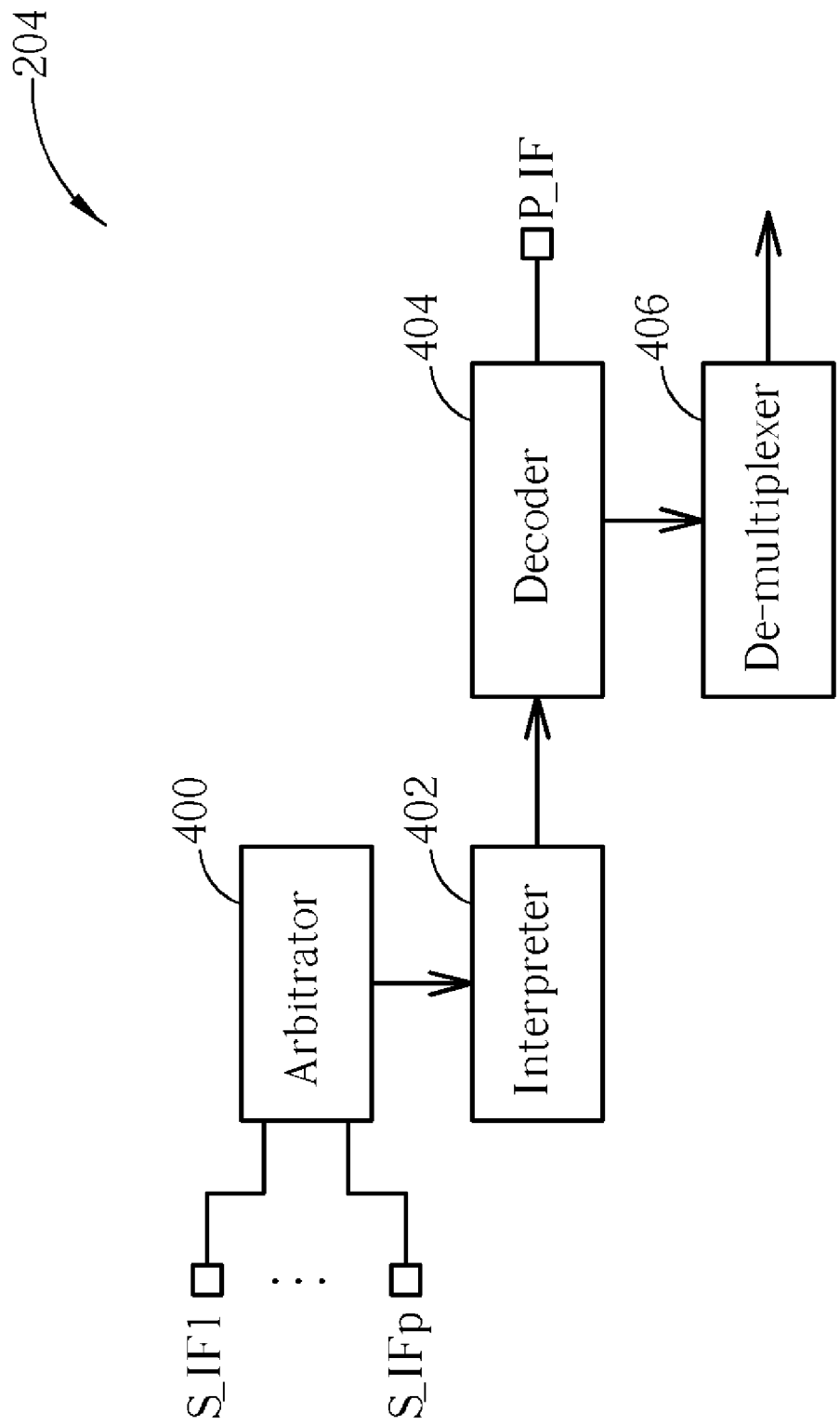
FIG. 4 depicts a schematic diagram of a bridge of the SoC shown in FIG. 2.

Please refer to FIG. 4. FIG. 4 depicts a schematic diagram of the bridge 204 of the SoC 20. The bridge 204 includes an arbitrator 400, an interpreter 402, a decoder 404, and a demultiplexer 406. The arbitrator 400 is coupled to the system transmission interfaces S_IF1~S_Ifp and used for determining and obtaining control signals outputted from the master devices MS1~MSp, which are utilized for controlling the peripheral slave devices P_SL1~P_SLn. The interpreter 402 is coupled to the arbitrator 400 and used for interpreting results of the arbitrator 400 via a finite-state operation. The decoder 404 is coupled to the interpreter 402, and utilized for decoding results of the interpreter 402 and outputting interpretation results to the peripheral slave devices P_SL1~PSLn via the peripheral data transmission interface P_IF. The demultiplexer 406 is used for selecting data of the peripheral slave devices P_SL1~P_SLn for corresponding master devices.

Therefore, the bridge 204 directly receives the control signals of the master devices MS1~MSp via the system data transmission interfaces S_IF1~SIFp, captures control signals utilized for controlling the peripheral slave devices P_SL1~PSLn via the arbitrator 400, and outputs the control signals to the interpreter 402 at last. After the interpreter 402 obtains interpretation results via the finite-state operation, the decoder 404 can determine the control signals conforming to the APB protocol, so as to control the peripheral slave devices P_SL1~P_SLn via the peripheral data transmission interface P_IF. In other words, the arbitrator 400 determines the control signals utilized for controlling the peripheral slave devices P_SL1~PSLn and decides priorities of the control signals. Subsequently, the interpreter 402 and the decoder 404 can perform interpretation and decoding so as to control corresponding peripheral slave devices.

Note that the arbitrator 400 is different from the arbitrator of the first system 200 (AHB system). The arbitrator in the infrastructure of the first system 200 is used for determining priorities of the master devices MS1~MSp for using system resources, while the arbitrator 400 of the bridge 204 is used for determining and capturing control signals outputted from the master devices MS1~MSp and utilized for controlling the peripheral slave devices P_SL1~P_SLn.

In the prior art, the AHB system is a multi-master and pipeline-operation system, allowing only one master device using bus resources at one time, and the APB system is under control of the AHB system via a bridge. Therefore, the APB system can be under control of only one master device at one time, leading to the result that efficiency and bandwidth-utility rate of the APB system are restricted by procedures of the AHB system. In contrast, the present invention can directly receive control signals outputted from master devices, meaning that more than one master device can simultaneously control the peripheral slave devices via the bridge. Therefore, the present invention can maintain efficiency of the AHB system, and enhance efficiency and bandwidth-utility rate of the APB system in the premise that the present invention conforms to the protocol specification of the AMBA.

Figure 5:
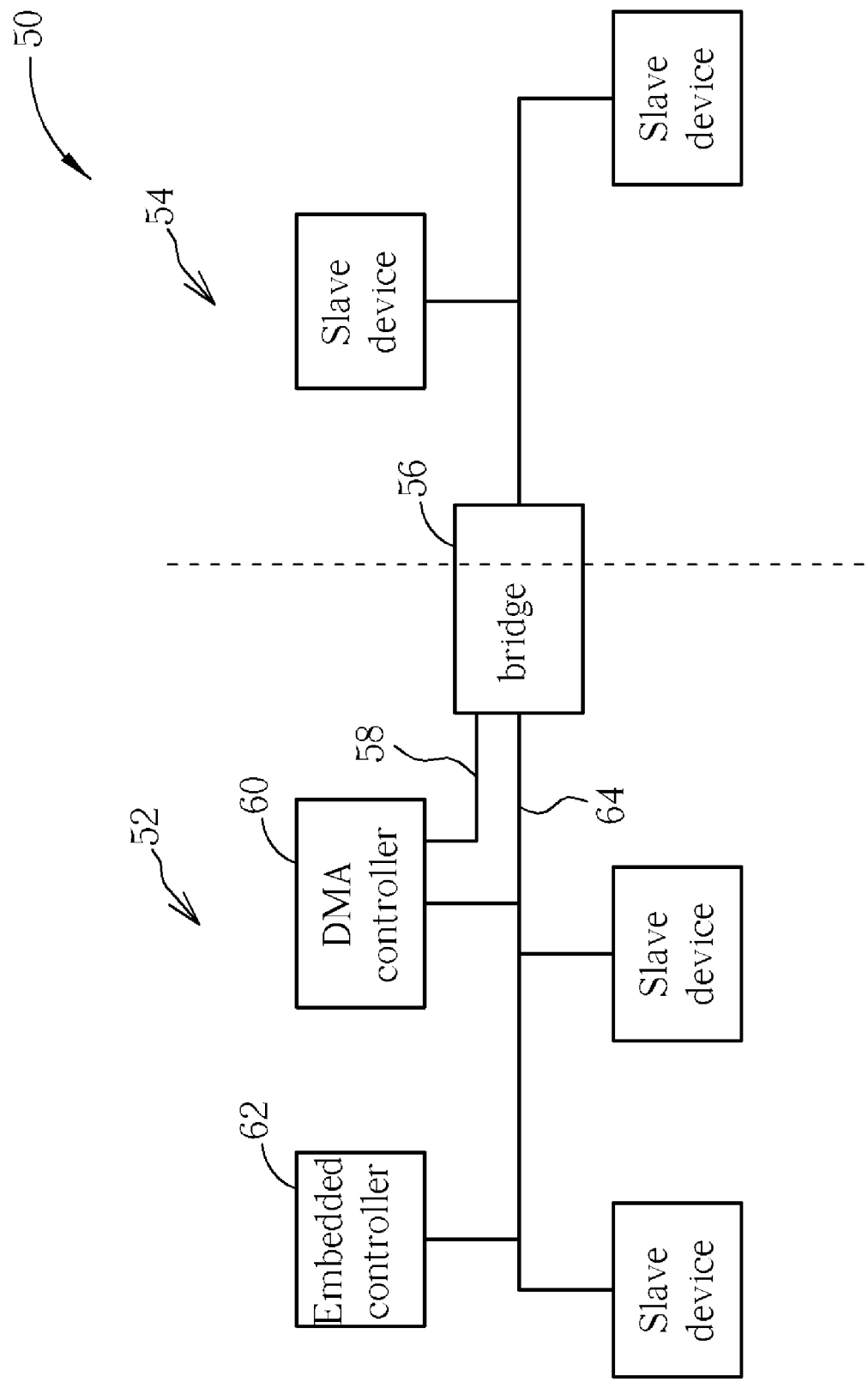
FIG. 5 depicts a schematic diagram of an SoC in accordance with an embodiment of the present invention.

For example, please refer to FIG. 5. FIG. 5 depicts a schematic diagram of an AMBA SoC 50 in accordance with an embodiment of the present invention. The SoC includes an AHB system 52, an APB system 54, and a bridge 56 between the AHB system 52 and the APB system 54. The AHB system 52 includes master devices, such as an embedded processor 62 and a direct memory access (DMA) controller 60, slave devices and an infrastructure. In the AHB system 52, all signal transmissions are triggered by the master devices and responded by the slave devices. The APB system 54 implements a low-speed and low power-consumption external bus and is used for connecting peripheral slave devices demanding lower bandwidth. The structure of the bridge 56 is similar to the bridge 204 shown in FIG. 4, but the bridge 56 includes only two system data transmission interfaces, respectively connected to bus circuits of the DMA controller 60 and the AHB system 52 via paths 58 and 64. Therefore, when the system resources of the AHB system 52 are occupied (as the embedded processor 62 is accessing a system slave device), the DMA controller 60 can access data of the peripheral slave devices via the path 58, so that the APB system 54 does not idle, thereby enhancing efficiency and bandwidth-utility rate. Please refer to description below.

Firstly, according to the protocol specification of the AMBA, signals corresponding to the AHB system include: HCLK, HRESETn, HADDR[31:0], HTRANS[1:0], HWRITE, HSIZE[2:0], HBURST[2:0], HPROT[3:0], HWDATA[31:0], HSELx, HRDATA[31:0], HREADY, HRESP[1:0], HBUSREQx, HLOCKx, HGRANTx, HMASTER[3:0], HMASTLOCK, HSPLITx[15:0]. Signals corresponding to the APB system include: PCLK, PRESETn, PADDR[31:0], PSELx, PENABLE, PWRITE, PRDATA, PWDATA. For simplicity, only signals corresponding to the SoC 50 in FIG. 5 are listed as follows, and other signals can be referred in the AMBA protocol.

HCLK: bus clock. All signal timings are related to the rising edge of the HCLK.

HADDR[31:0]: delivered by master devices and denoting system bus addresses.

HTRANS[1:0]: delivered by master devices and denoting current transfer type. According to the AMBA protocol specification, the AHB system includes four transfer types, IDLE, BUSY, SEQ, and NONSEQ.

HWRITE: delivered by master devices. Signal high denotes write transfer and signal low denotes read transfer.

HWDATA[31:0]: delivered by master devices and denoting a write data bus.

HSELx: delivered by an infrastructure of a decoder and denoting a chosen slave device.

HRDATA[31:0]: delivered by slave devices and denoting a read data bus.

HREADY: delivered by slave devices. Signal high denotes transfer done and signal low denotes extending transfer.

HRESP[1:0]: delivered by slave devices and denoting transfer response.

PSELx: denotes a chosen peripheral slave device.

PENABLE: denotes the second cycle of an APB transfer.

PWRITE: denoting transfer direction.

PWDATA: denoting write data bus.

Figure 6:
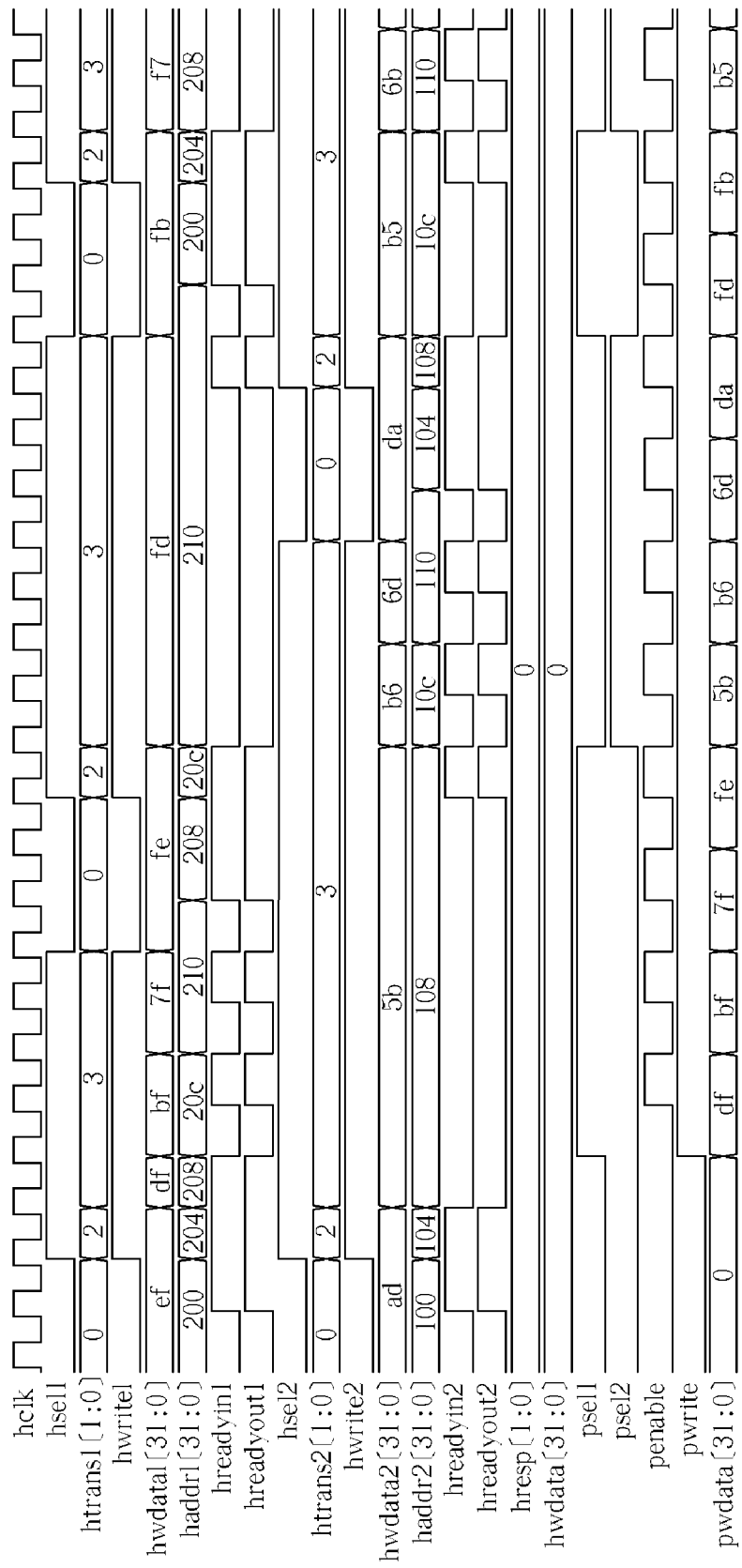
FIG. 6 depicts a schematic diagram of signal waveforms corresponding to an operation of simultaneously writing performed by the SoC shown in FIG. 5.
Figure 7:
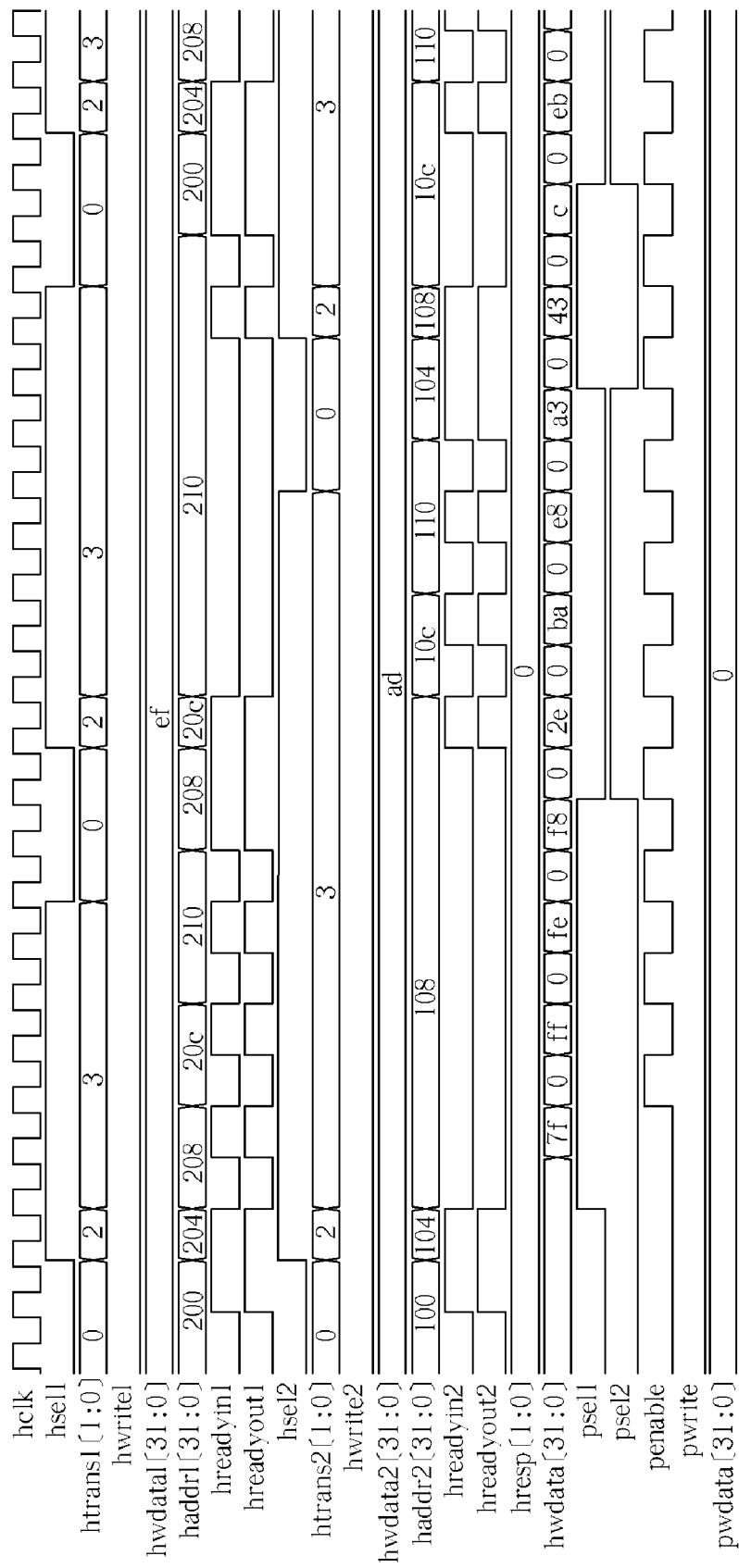
FIG. 7 depicts a schematic diagram of signal waveforms corresponding to an operation of simultaneously reading performed by the SoC shown FIG. 5.
Figure 8:
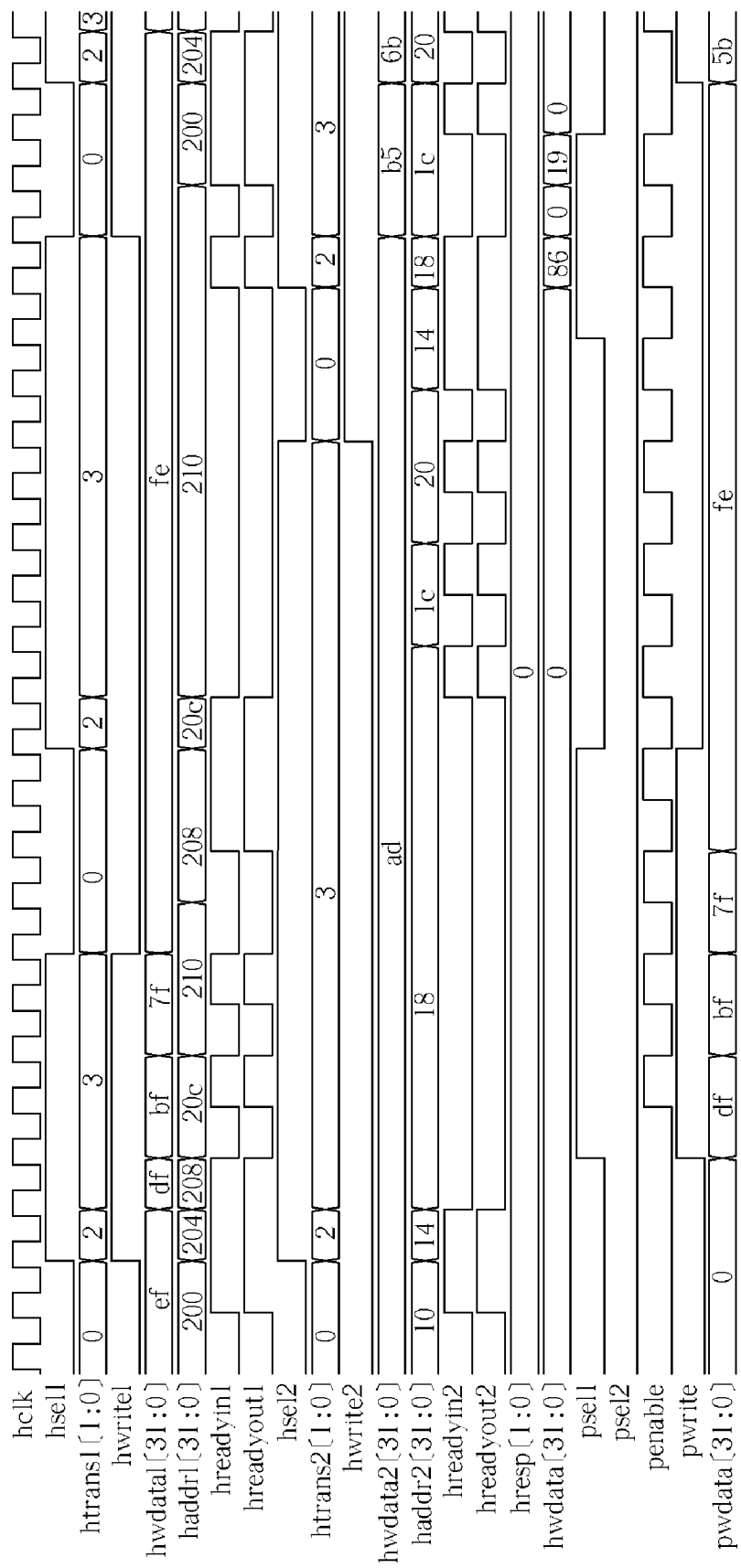
FIG. 8 depicts a schematic diagram of signal waveforms corresponding to an operation of simultaneously writing and reading performed by the SoC shown in FIG. 5.

Please refer to FIG. 6 to FIG. 8 depicting schematic diagrams of signal waveforms corresponding to the SoC 50 when performing operations of simultaneously writing, simultaneously reading, and simultaneously writing and reading. As shown in FIG. 6 to FIG. 8, according to the signals HSEL1 and HSEL2 outputted from the AHB system 52, the slave devices having higher priority are processed early, so as to implement operations of simultaneously writing, simultaneously reading, simultaneously writing and reading. In contrast, in the prior art, when system resources of the AHB system are occupied, the APB system goes into idle. Therefore, the present invention can apparently enhance efficiency and bandwidth-utility rate of the APB system.

In summary, the present invention can directly receive control signals outputted from the master devices and allow more than one master device simultaneously controlling peripheral slave devices via a bridge. Therefore, in the premise of conforming to the AMBA protocol, the present invention not only maintains efficiency of the AHB system but also enhances efficiency, bandwidth-utility rate of the APB system.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A bridge circuit coupled between a first master device of a first bus system and a slave device of a second bus system, the bridge circuit comprising:
    a first path installed in the first bus system, for accessing the slave device by the first master device;
    a second path installed in the first bus system, shared among the first master device and a second master device of the first bus system, wherein the second path is allowed to be accessed by one master device at any time; and
    a third path installed in the second bus system, coupled to the slave device, wherein the first master device accesses data of the slave device via the first path and the third path when the second path is occupied by the second master device,
    wherein, the first bus system conforms to an Advanced High-Performance Bus (AHB) protocol and the second bus system conforms an Advanced Peripheral Bus (APB) protocol.

2. The bridge circuit of claim 1 further comprising a first system data transmission interface coupled to the first path, for receiving control signals outputted from the first master device when the second path is occupied by the second master device.

3. The bridge circuit of claim 2 further comprising a second system data transmission interface for controlling the slave device according to the control signals.

4. The bridge circuit of claim 2 further comprising an arbitrator coupled to the first system data transmission interface and the second path, for determining and obtaining control signals utilized for controlling the slave device from the first and second master devices.

5. The bridge circuit of claim 4, wherein the arbitrator further determines priorities of the control signals.

6. The bridge circuit of claim 4 further comprising:
    an interpreter coupled to the arbitrator, for interpreting results of the arbitrator via a finite-state operation; and
    a decoder coupled to the interpreter, for decoding results of the interpreter, so as to control the slave device.

7. A method for accessing data between a first master device of a first bus system and a slave device of a second bus system, comprising steps of:
    providing a first path only serving the first master device, wherein the first path is installed in the first bus system;
    providing a second path shared among the first master device and a second master device, wherein the second path is installed in the first bus system and is allowed to be accessed by one master device at any time; and
    providing a third path coupled to the slave device, wherein the third path is installed in the second bus system, and the first master device accesses data of the slave device via the first path and the third path when the second path is occupied by the second master device,
    wherein, the first bus system conforms to an Advanced High-Performance Bus (AHB) protocol and the second bus system conforms an Advanced Peripheral Bus (APB) protocol.

8. The method of claim 7 further comprising determining and obtaining control signals utilized for controlling the slave device from the first and second master devices.

9. The method of claim 8 further comprising determining priorities of the control signals.

* * * * *